No. 863,451. PATENTED AUG. 13, 1907.
T. ROWLAND.
VEHICLE WHEEL.
APPLICATION FILED APR. 9, 1906.
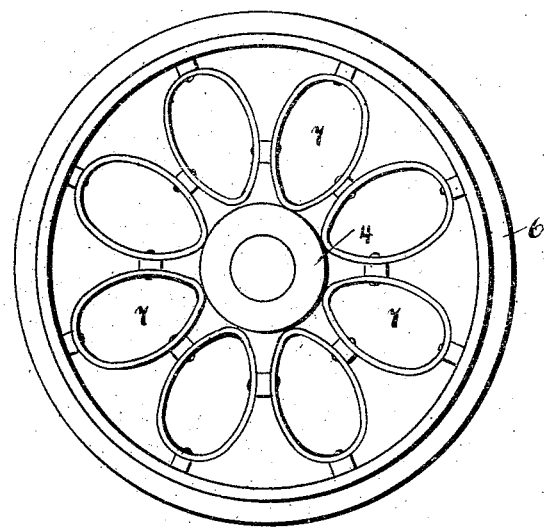
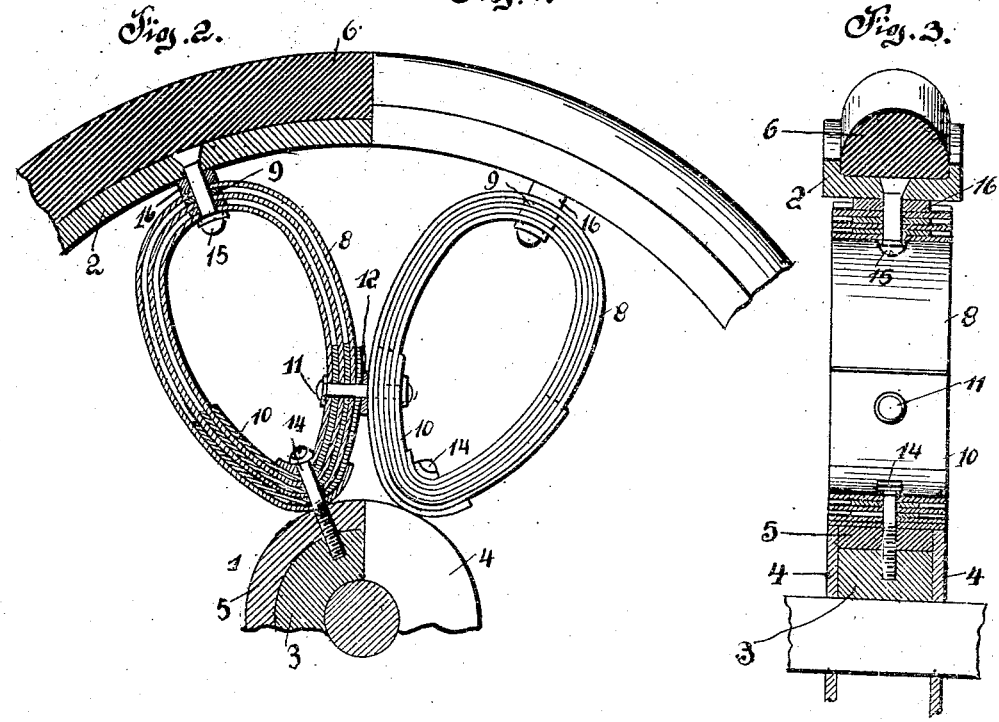
Witnesses:
C. Klostermann
[signature]
Inventor.
Thomas Rowland
[signature]
by
Attorneys.

UNITED STATES PATENT OFFICE.

THOMAS ROWLAND, OF CORAOPOLIS, PENNSYLVANIA.

VEHICLE-WHEEL.

No. 863,451.   Specification of Letters Patent.   Patented Aug. 13, 1907.

Application filed April 9, 1906. Serial No. 310,620.

*To all whom it may concern:*

Be it known that I, THOMAS ROWLAND, a citizen of the United States of America, residing at Coraopolis, in the county of Allegheny and State of Pennsylvania, have invented certain new and useful Improvements in Vehicle-Wheels, of which the following is a specification, reference being had therein to the accompanying drawing.

This invention relates to certain new and useful improvements in wheels, and the invention has for its primary object to provide a novel form of resilient wheel and dispenses with the ordinary wood and metallic spokes heretofore used in connection with a wheel.

Another object of this invention is to provide a wheel particularly adapted for motor driven vehicles and such vehicles as are generally used for pleasure purposes, although my improved wheel can be readily constructed for light weight wagons and drays. I have constructed my improved wheel to add further resiliency to the body of the vehicle than that now derived from springs mounted between the axles of a vehicle and the body portion thereof, at the same time maintaining sufficient rigidity to prevent the wheels from breaking or collapsing, and in this manner providing a strong and durable wheel capable of sustaining considerable weight.

My improved wheels are constructed upon a scientific principle which tends to overcome the stresses and strains exerted upon the rim of a wheel by the weight sustained by the axle of a wheel, thus reducing the deflection of a wheel to a minimum, and insuring smoother traveling than what would be realized from the present type of wheel.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 1 is a side elevation of my improved wheel, the same being illustrated diagrammatically.

Figure 2 is a front elevation of a portion of a wheel constructed in accordance with my invention, a portion of the wheel being illustrated in section.

Figure 3 is a vertical cross sectional view of a portion of the wheel constructed in accordance with my invention.

To put my invention into practice, I construct my improved wheel of a hub 1 and a rim or felly 2, these parts being preferably made of strong and durable metal. The hub 1 comprises a body portion 3, side plates 4, 4, and a retaining band or ring 5. The rim or felly 2 is substantially channel-shaped in cross section and is adapted to support a metallic or rubber tire 6. Between the hub 1 and the rim 2 is arranged a plurality of radially disposed elliptical springs 7, the major axes of the springs being radial relative to the hub 1, corresponding to the ordinary spokes commonly used in wheels. The springs 7 are identical in construction and are secured to the hub, to one another and to the rim to form a flexible and resilient structure capable of normally maintaining the hub 1 centrally of the rim 2, at the same time permitting the same to recede in any direction relative to said rim.

Each spring is constructed of a strip of metal 8 which is bent to form an ellipse, the strip of metal being wrapped upon itself a number of times, each wrapping being separated by resilient washers 9 and 10, the washers 9 being located at the outer ends of the elliptical springs while the washers 10 are located at the inner ends of the elliptical springs. The washers 10 correspond to strips of metal and are made of a length approximately one-half the contour of the spring.

The springs 7 arranged between the hub 1 and the rim 2 of the wheel are secured together by a plurality of rivets 11 or similar fastening means, said rivets passing through the upper ends of the washers 10, the wrappings of each spring, and a washer 12 interposed between said springs. The springs are secured to the hub 1 by a plurality of screw bolts 14 and to the rim 2 by a plurality of rivets 15 or similar fastening means. The rivets 15 pass through resilient washers 16 interposed between the outer ends of the springs and the rim 2.

By constructing an elliptical spring of a strip of resilient metal which is wrapped upon itself a number of times, and each wrapping separated by a washer, I am enabled to obtain the greatest resiliency possible in a spring of this type, the resiliency of one wrapping being practically independent of its associate wrapping. I do not care to confine myself to the number of times a strip of metal is wrapped to form an elliptical spring, nor to the manner in which the springs composing the wheel are secured together or to the hub or rim of said wheel.

A suitable resilient material can be interposed between the wrappings of my improved springs, that is, between the ends of the washers 9 and 10, to fill the small space existing between the wrappings, and prevent dirt from interfering with the resiliency of each wrapping.

It is obvious that my improved springs can be readily used in connection with wooden hubs and wooden rims having metallic tires, therefore I do not care to confine myself to the specific adaptation of my improved springs, to wheels.

Such changes, as are permissible by the appended claims, may be resorted to without departing from the spirit and scope of the invention.

What I claim and desire to secure by Letters Patent, is:—

1. In a wheel, the combination with a hub, and a tire, of a plurality of elliptical springs supported between said hubs and said tire, and having their major axes radiating from said hub, each spring consisting of a strip of metal wrapped a number of times upon itself, washers interposed between said wrappings, substantially as described.

2. In a wheel, the combination with a hub, and a rim, of a plurality of elliptical spring supported between said hub and said rim, each spring consisting of a strip of metal wrapped upon itself a number of times, washers mounted between each wrapping, some of said washers being of a greater length than the others of said washers, substantially as described.

3. In a wheel, a substantially elliptical spring interposed between the felly and hub of the wheel with its ends connected respectively to said felly and hub, said spring formed from a single strip of metal wrapped upon itself a plurality of times, and washers interposed between the wrappings of said spring at the ends thereof.

4. In a wheel, a substantially elliptical spring interposed between the felly and hub of the wheel with its ends connected respectively to said felly and hub, said spring formed from a single strip of metal wrapped upon itself a plurality of times, and elastic washers interposed between the wrappings of said spring at the ends thereof.

5. A wheel spring of substantially elliptical form, formed from a single strip of metal wrapped upon itself a plurality of times, with flexible washers interposed between the wrappings thereof.

In testimony whereof I affix my signature in the presence of two witnesses.

THOMAS ROWLAND.

Witnesses:
C. KLOSTERMANN,
E. E. POTTER.